US008896872B2

(12) United States Patent
Saito (10) Patent No.: US 8,896,872 B2
(45) Date of Patent: Nov. 25, 2014

(54) PRINT CONTROL APPARATUS, PRINTING SYSTEM, AND NON-TRANSITORY COMPUTER READABLE MEDIUM (71) Applicant: Fuji Xerox Co., Ltd., Tokyo (JP)

(72) Inventor: Yasushi Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/058,733

(22) Filed: Oct. 21, 2013

(65) Prior Publication Data
US 2014/0240759 A1 Aug. 28, 2014

(30) Foreign Application Priority Data

Feb. 25, 2013 (JP) ................................. 2013-035107

(51) Int. Cl.
*G06F 3/12* (2006.01)
(52) U.S. Cl.
CPC .................................... *G06F 3/1296* (2013.01)
USPC .......................................... 358/1.15; 358/1.1
(58) Field of Classification Search
None
See application file for complete search history.

(56) References Cited

U.S. PATENT DOCUMENTS

| 6,226,097 | B1 * | 5/2001 | Kimura | 358/1.14 |
|---|---|---|---|---|
| 6,321,266 | B1 * | 11/2001 | Yokomizo et al. | 709/226 |
| 6,369,905 | B1 * | 4/2002 | Mitsuhashi et al. | 358/1.15 |
| 6,717,693 | B2 * | 4/2004 | Mitsuhashi et al. | 358/1.15 |
| 7,100,198 | B2 * | 8/2006 | Kurishita et al. | 726/4 |
| 7,231,435 | B2 * | 6/2007 | Ohta | 709/221 |
| 7,352,487 | B2 * | 4/2008 | Tokashiki | 358/1.18 |
| 7,894,083 | B2 * | 2/2011 | Kuroda et al. | 358/1.13 |
| 8,169,629 | B2 * | 5/2012 | Kuroda et al. | 358/1.13 |
| 8,305,595 | B2 * | 11/2012 | Kuroda et al. | 358/1.13 |
| 8,446,606 | B2 * | 5/2013 | Kuroda et al. | 358/1.13 |
| 2002/0030841 | A1 * | 3/2002 | Mitsuhashi et al. | 358/1.13 |
| 2002/0048038 | A1 * | 4/2002 | Mitsuhashi et al. | 358/1.15 |
| 2002/0181022 | A1 * | 12/2002 | Tokashiki | 358/1.18 |
| 2005/0192969 | A1 * | 9/2005 | Haga et al. | 707/10 |
| 2009/0237732 | A1 * | 9/2009 | Kuroda et al. | 358/1.15 |
| 2011/0176167 | A1 * | 7/2011 | Takagi | 358/1.15 |

FOREIGN PATENT DOCUMENTS

| JP | A-4-245524 | 9/1992 |
|---|---|---|
| JP | A-2005-44002 | 2/2005 |
| JP | A-2005-216151 | 8/2005 |
| JP | A-2006-277197 | 10/2006 |

* cited by examiner

*Primary Examiner* — Marcus T Riley
(74) *Attorney, Agent, or Firm* — Oliff PLC (57) ABSTRACT

A print control apparatus includes a determination unit and a controller. The determination unit determines, from among plural virtual print controllers each of which controls printing at a printing apparatus associated with the virtual print controller, whether or not any of the virtual print controllers has started operating in the print control apparatus. The controller performs control, in a case where it is determined that none of the virtual print controllers have started operating, such that a state of reception of print command information is set to be a state in which the print command information is not received, and thereafter performs control, in a case where it is determined that any of the virtual print controllers has started operating, such that the state of reception is set to be a state in which print command information is received.

18 Claims, 8 Drawing Sheets

PRINT CONTROL APPARATUS, PRINTING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-035107 filed Feb. 25, 2013.

BACKGROUND

Technical Field

The present invention relates to a print control apparatus, a printing system, and a non-transitory computer readable medium.

SUMMARY

According to an aspect of the invention, there is provided a print control apparatus including a determination unit and a controller. The determination unit determines, from among plural virtual print controllers each of which controls printing at a printing apparatus associated with the virtual print controller, whether or not any of the virtual print controllers has started operating in the print control apparatus, the plural virtual print controllers virtually realizing plural apparatuses in a single apparatus upon operating in the single apparatus. The controller performs control, in a case where the determination unit has determined that none of the virtual print controllers have started operating in the print control apparatus from among the plural virtual print controllers, such that a state of reception of print command information, which commands printing at a printing apparatus, is set to be a state in which the print command information is not received, and thereafter performs control, in a case where the determination unit has determined that any of the virtual print controllers has started operating in the print control apparatus from among the plural virtual print controllers, such that the state of reception is set to be a state in which print command information that commands printing at a printing apparatus associated with the virtual print controller is received.

BRIEF DESCRIPTION OF THE DRAWINGS

An exemplary embodiment of the present invention will be described in detail based on the following figures, wherein.

DETAILED DESCRIPTION

In the following, an exemplary embodiment will be described in detail with reference to the attached drawings.

Figure 1:
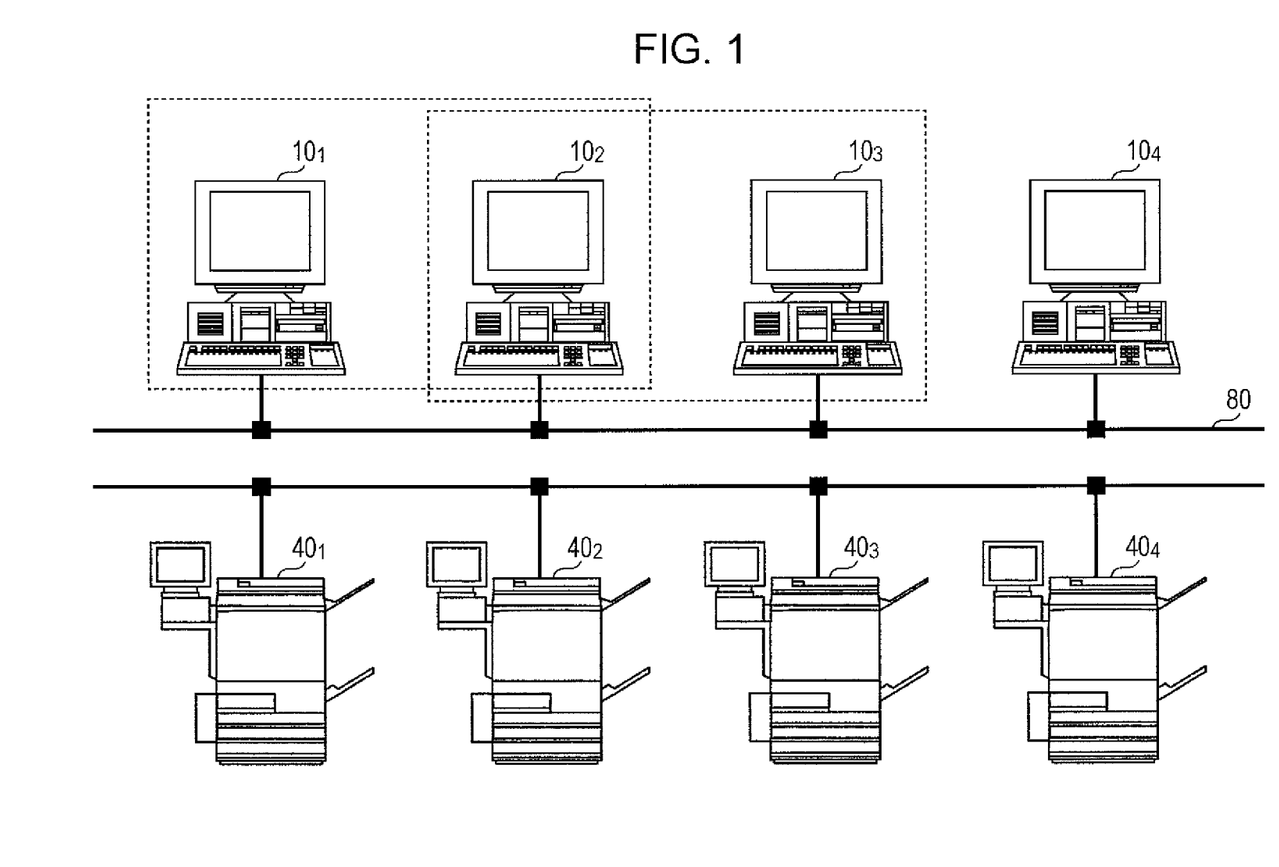
FIG. 1 is a diagram illustrating an example of the structure of a printing system to which an exemplary embodiment is applied.

FIG. 1 illustrates an example of the entire structure of a printing system to which the exemplary embodiment is applied.

As illustrated in FIG. 1, this printing system is configured such that information processing apparatuses $10_1$, $10_2$, $10_3$, and $10_4$ and image processing apparatuses $40_1$, $40_2$, $40_3$, and $40_4$ are connected to a network 80 such as a local area network (LAN) or the like. Here, in the case where the information processing apparatuses $10_1$, $10_2$, $10_3$, and $10_4$ do not have to be distinguished from each other, they are called information processing apparatuses 10 and the number of information processing apparatuses 10 is not limited to four. In addition, in the case where the image processing apparatuses $40_1$, $40_2$, $40_3$, and $40_4$ do not have to be distinguished from each other, they are called image processing apparatuses 40 and the number of image processing apparatuses 40 is not limited to four.

An information processing apparatus 10 is a computer device functioning as a print server, which is an example of a print control apparatus that controls printing at an image processing apparatus 40. Specifically, a virtual print server, which is an example of a virtual print controller, is operated in an information processing apparatus 10 and the information processing apparatus 10 virtually realizes a print server. That is, an information processing apparatus 10 receives print command information from a terminal apparatus, which is not illustrated, the print command information commanding printing at an image processing apparatus 40. The information processing apparatus 10 generates print data on the basis of this print command information, the print data including page description language (PDL) data, and transmits the print data to the image processing apparatus 40, which is an output destination. In addition, for some information processing apparatuses 10, clustering is performed using, for example, Windows Server Failover Clustering (WSFC) in order that the information processing apparatuses 10 serve as highly-available virtual print servers. That is, in normal times, a virtual print server operates in an information processing apparatus 10 in a cluster of information processing apparatuses 10 and the information processing apparatus 10 virtually realizes a print server. In the case where a malfunction occurs in the information processing apparatus 10, the virtual print server operates in another information processing apparatus 10 in the cluster and the other information processing apparatus 10 virtually realizes the print server. In FIG. 1, as encircled by dotted lines, clustering is performed for the information processing apparatuses $10_1$ and $10_2$ and also for the information processing apparatuses $10_2$ and $10_3$. Clustering is not performed for the information processing apparatus $10_4$. Note that, in the following, information processing apparatuses 10 for which clustering is performed are called information processing apparatuses 10 that are "in a cluster environment", and information processing apparatuses 10 for which clustering is not performed are called information processing apparatuses 10 that are "not in a cluster environment." In addition, in a cluster of information processing apparatuses 10, an information processing apparatus 10 in which a virtual print server operates in normal times is called a "normal operation type." An information processing apparatus 10 in which a virtual print server operates in the case where a malfunction has occurred in a normal-operation-type information processing apparatus 10 is called a "backup type."

An image processing apparatus 40 is an apparatus that forms an image on a recording medium such as a sheet and outputs a printed medium. Here, as an image processing apparatus 40, an apparatus having only a printing function may be used or an apparatus having other image processing functions such as a scanner function and a facsimile function in addition to the printing function may be used. In this exemplary embodiment, an image processing apparatus 40 is provided as an example of a printing apparatus.

Next, the hardware structure of an information processing apparatus 10 will be described.

Figure 2:
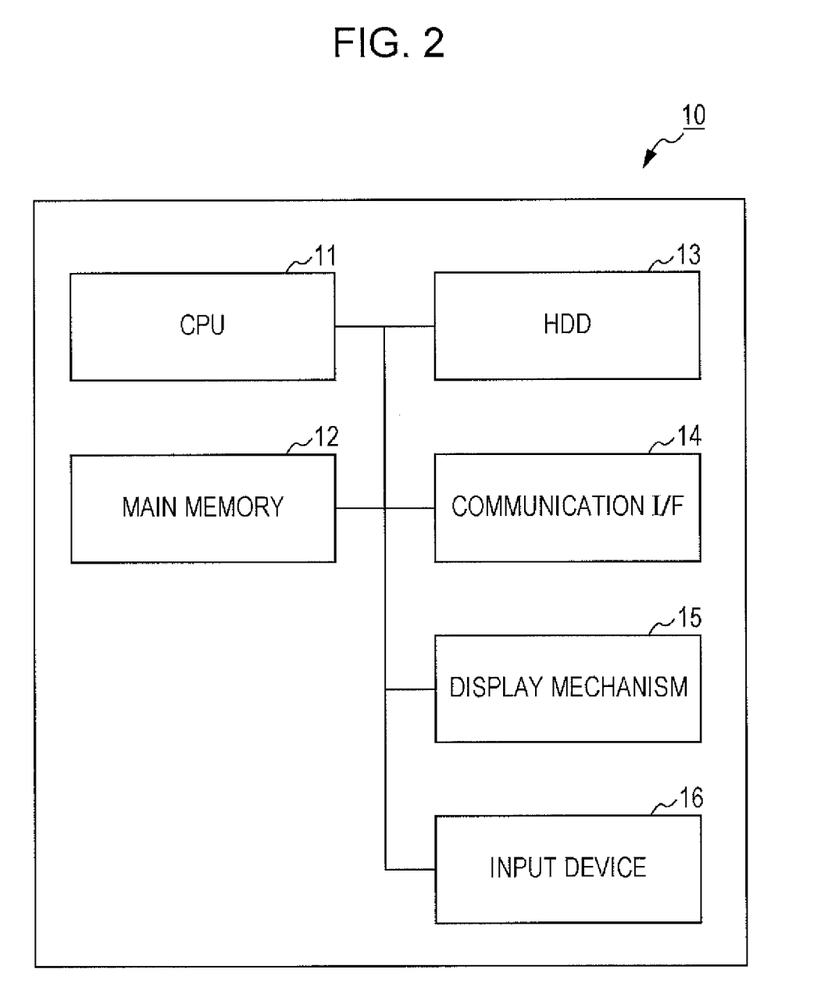
FIG. 2 is a diagram illustrating an example of a hardware structure of an information processing apparatus in the exemplary embodiment.

FIG. 2 is a diagram illustrating a hardware structure of an information processing apparatus 10.

As illustrated in FIG. 2, an information processing apparatus 10 includes a central processing unit (CPU) 11, a main memory 12, and a hard disk drive (HDD) 13, the CPU 11 being an arithmetic unit and the main memory 12 being a memory unit. Here, the CPU 11 executes various pieces of software such as an operating system (OS) and applications and realizes various functions described later. In addition, the main memory 12 is a storage area in which various pieces of software, data for execution of the various pieces of software, and the like are stored. The HDD 13 is a storage area in which data to be input to various pieces of software, data output from various pieces of software, and the like are stored.

Furthermore, the information processing apparatus 10 includes a communication interface 14, hereinafter referred to as a "communication I/F 14", a display mechanism 15, and an input device 16. The communication I/F 14 performs communication to and from the outside. The display mechanism 15 includes a video memory, a display, and the like. The input device 16 includes a keyboard, a mouse, and the like.

Next, the hardware structure of an image processing apparatus 40 will be described.

Figure 3:
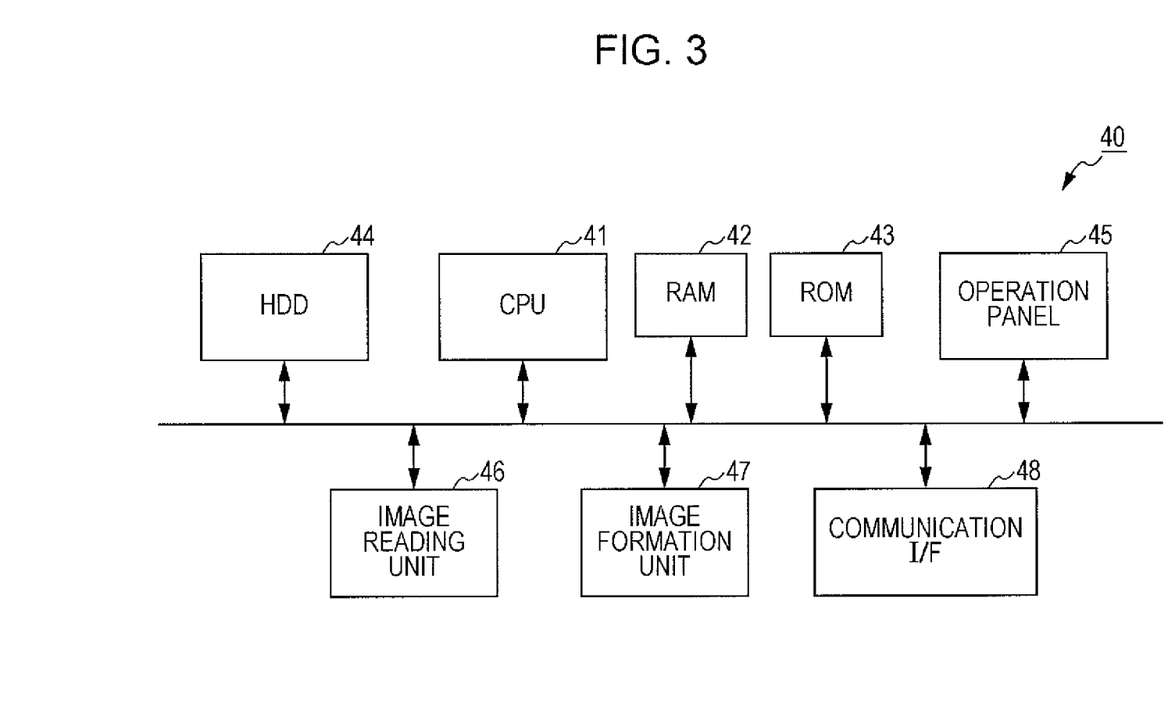
FIG. 3 is a diagram illustrating an example of a hardware structure of an image processing apparatus in the exemplary embodiment.

FIG. 3 is a diagram illustrating a hardware structure of an image processing apparatus 40.

As illustrated in FIG. 3, the image processing apparatus 40 includes a CPU 41, a random-access memory (RAM) 42, a read-only memory (ROM) 43, a HDD 44, an operation panel 45, an image reading unit 46, an image formation unit 47, and a communication I/F 48.

The CPU 41 loads, into the RAM 42, various programs stored in the ROM 43 or the like, executes the loaded various programs, and realizes various functions described later.

The RAM 42 is a memory used as a work memory or the like for the CPU 41.

The ROM 43 is a memory for storing various programs and the like to be executed by the CPU 41.

The HDD 44 is, for example, a magnetic disk unit that stores image data read by the image reading unit 46, image data to be used in image formation performed by the image formation unit 47, and the like.

The operation panel 45 is, for example, a touch screen that displays various types of information and receives an operation input by a user.

The image reading unit 46 reads an image recorded on a recording medium such as a sheet. Here, the image reading unit 46 is, for example, a scanner. It is desirable that a scanner using a charge-coupled device (CCD) system be used in which reflected light out of light radiated onto a document by a light source is gathered by a lens and received by a CCD or a scanner using a Contact Image Sensor (CIS) system be used in which reflected light out of light rays continuously radiated by an LED light source onto a document is received by a CIS.

The image formation unit 47 forms an image on a recording medium. Here, the image formation unit 47 is, for example, a printer. It is desirable that a printer using an electrophotographic system be used in which an image is formed by transferring toner adhered to a photoconductor drum onto a recording medium or a printer using an inkjet system be used in which an image is formed by ejecting ink onto a recording medium.

The communication I/F 48 transmits and receives various types of information to and from another apparatus via the network 80.

In this exemplary embodiment, as described above, in the case where an information processing apparatus 10 in a cluster of information processing apparatuses 10 virtually realizes a print server, when a malfunction occurs in the information processing apparatus 10, the functions of the print server are transferred from the information processing apparatus 10 to another information processing apparatus 10 in the cluster.

Figure 4:
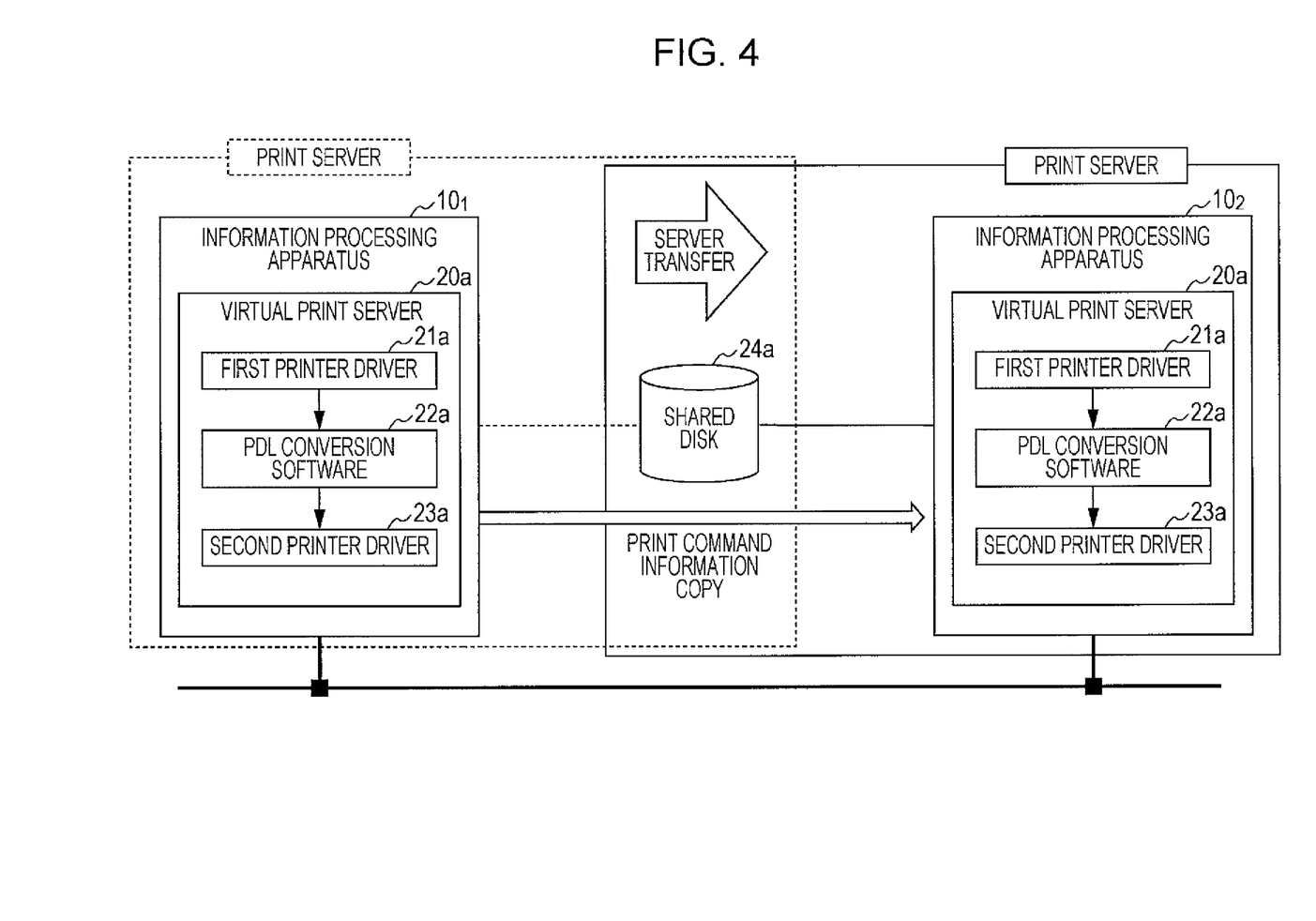
FIG. 4 is a diagram illustrating transfer processing for a print server in the case where a malfunction has occurred in an information processing apparatus.

FIG. 4 is a diagram schematically illustrating transfer processing for a print server. Note that, in FIG. 4, the cluster including the information processing apparatus $10_1$ and $10_2$ illustrated in FIG. 1 is illustrated as an example and a case where a malfunction has occurred in the information processing apparatus $10_1$ is illustrated.

First, a state before a malfunction occurs in the information processing apparatus $10_1$ is described.

Before occurrence of a malfunction, the information processing apparatus $10_1$ realizes a print server encircled by a broken line. Specifically, a virtual print server 20a operates in the information processing apparatus $10_1$ and the information processing apparatus $10_1$ realizes a print server together with a shared disk 24a. In addition, a first printer driver 21a, PDL conversion software 22a, and a second printer driver 23a operate in the information processing apparatus $10_1$. Here, the first printer driver 21a is, for example, a printer driver for a dedicated printer. The first printer driver 21a is an example of a first generator that generates print command information that commands printing at a first-type printing apparatus. The second printer driver 23a is a printer driver for a general printer in the case where, for example, a material that is supposed to be output to a dedicated printer is output to the general printer instead of the dedicated printer. The second printer driver 23a is an example of a second generator that generates print command information that commands printing at a second-type printing apparatus. Since there may be a case where an output result is not satisfactory when only the second printer driver 23a is operated in the information processing apparatus $10_1$, the PDL conversion software 22a is used. The PDL conversion software 22a converts PDL data generated by the first printer driver 21a into data to be input to the second printer driver 23a. That is, the PDL conversion software 22a is an example of a converter that converts print command information generated by a first generator into information used to generate print command information by a second generator. Note that, among these programs, the first printer driver 21a and the second printer driver 23a are programs that operate in the virtual print server 20a. In contrast, the PDL conversion software 22a does not operate in the virtual print server 20a but on the OS. For convenience of preparation of drawings, the PDL conversion software 22a is illustrated in the virtual print server 20a.

In this state, it is assumed that a malfunction has occurred in the information processing apparatus $10_1$.

Then, the functions of the print server are transferred from the information processing apparatus $10_1$ to the information processing apparatus $10_2$ and the information processing apparatus $10_2$ realizes a print server encircled by a solid line. Specifically, the virtual print server 20a operates in the information processing apparatus $10_2$ and the information processing apparatus $10_2$ realizes the print server together with the shared disk 24a. In this case, the first printer driver 21a, the PDL conversion software 22a, and the second printer driver 23a operate in the information processing apparatus $10_2$, too.

In the case where the functions of a print server are transferred in this manner, print command information subjected to processing in the information processing apparatus $10_1$ is transferred together with an intermediate file temporarily generated in the processing to the information processing apparatus $10_2$ via the shared disk 24a.

However, there is an issue in that a situation occurs in which information regarding the print command information subjected to processing in the information processing apparatus $10_1$ is changed in the information processing apparatus $10_2$ and thus print command information is not successfully transferred. Specifically, although the identification number of the print command information subjected to processing in the information processing apparatus $10_1$ is changed in the information processing apparatus $10_2$, the identification number used in the information processing apparatus $10_1$ is transferred to the information processing apparatus $10_2$ as the identification number of the print command information used to generate the intermediate file. Thus, there are cases where identification number inconsistency occurs in the information processing apparatus $10_2$, and, as a result, the intermediate file remains and subsequent printing is unable to continue.

In order to address such an issue, it is conceivable that the information processing apparatus $10_2$ performs processing on print command information transferred from the information processing apparatus $10_1$ in a state in which the information processing apparatus $10_2$ is initialized by restarting an OS spooler.

However, for such an issue, there are also cases where restarting of the OS spooler is not effective.

Figure 5:
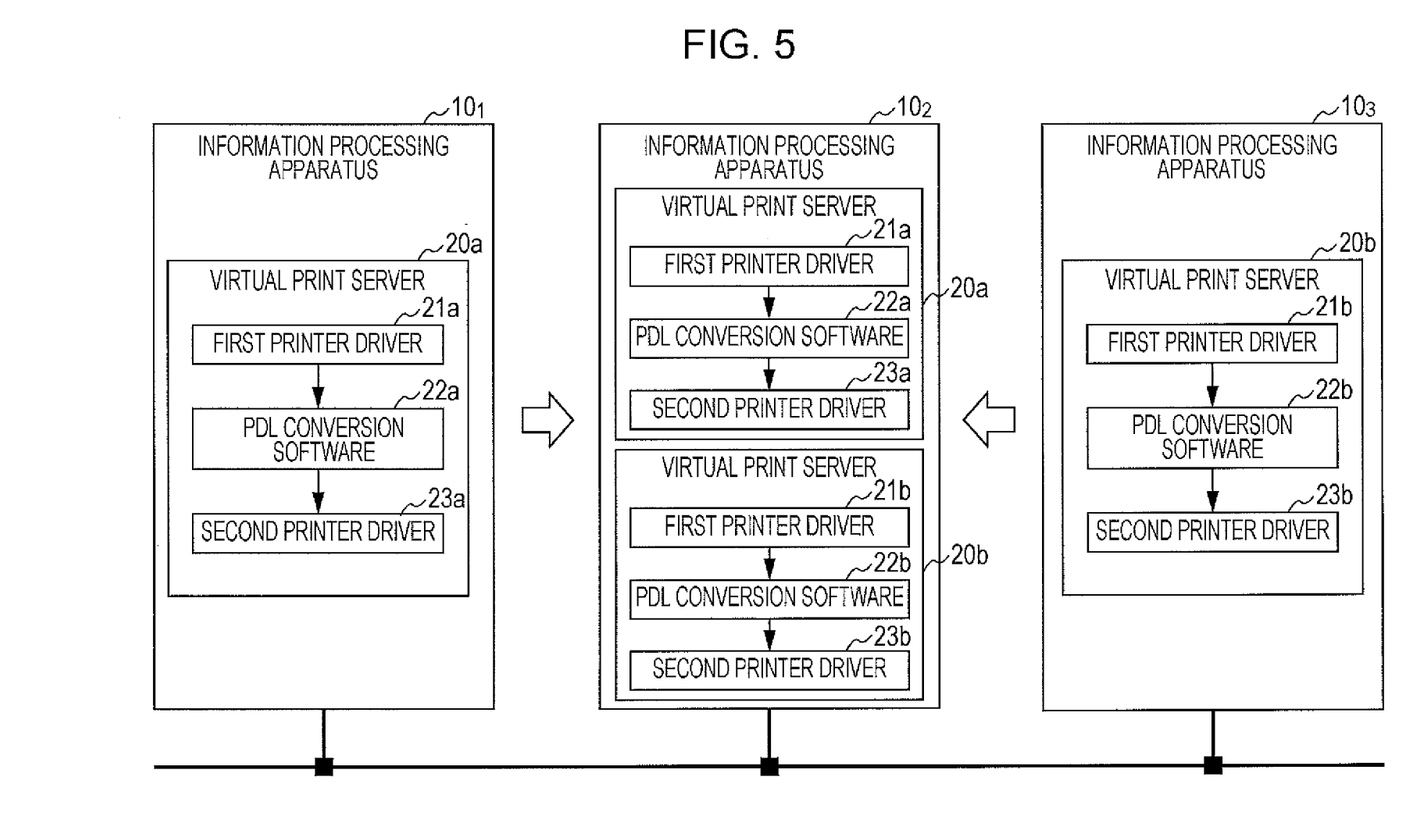
FIG. 5 is a diagram illustrating transfer processing for a print server in the case where malfunctions have occurred in information processing apparatuses.

FIG. 5 is a diagram schematically illustrating transfer processing for a print server in such a case. Note that, in FIG. 5, the cluster including the information processing apparatuses $10_1$ and $10_2$ and the cluster including the information processing apparatuses $10_2$ and $10_3$ illustrated in FIG. 1 are described as examples and a case where malfunctions have occurred in the information processing apparatuses $10_1$ and $10_3$ is illustrated.

First, a state before malfunctions occur in the information processing apparatuses $10_1$ and $10_3$ is described.

Before occurrence of a malfunction, the virtual print server 20a operates in the information processing apparatus $10_1$ and the information processing apparatus $10_1$ realizes a print server. In addition, the first printer driver 21a, the PDL conversion software 22a, and the second printer driver 23a operate in the information processing apparatus $10_1$. Note that these programs have already been described and thus description thereof is omitted here.

In contrast, before occurrence of a malfunction, a virtual print server 20b operates in the information processing apparatus $10_3$ and the information processing apparatus $10_3$ realizes a print server. In addition, a first printer driver 21b, PDL conversion software 22b, and a second printer driver 23b operate in the information processing apparatus $10_3$. Note that these programs correspond to the first printer driver 21a, the PDL conversion software 22a, and the second printer driver 23a. Thus, description thereof is omitted here. In addition, in the following description, in the case where the virtual print servers 20a and 20b, the first printer drivers 21a and 21b, pieces of the PDL conversion software 22a and 22b, and the second printer drivers 23a and 23b do not have to be distinguished from each other, they are called, respectively, virtual print servers 20, first printer drivers 21, pieces of PDL conversion software 22, and second printer drivers 23.

In this state, it is assumed that a malfunction has occurred in the information processing apparatus $10_1$.

Then, the functions of the print server are transferred from the information processing apparatus $10_1$ to the information processing apparatus $10_2$. The virtual print server 20a operates in the information processing apparatus $10_2$ and the information processing apparatus $10_2$ realizes the print server. In this case, the first printer driver 21a, the PDL conversion software 22a, and the second printer driver 23a operate in the information processing apparatus $10_2$, too.

Thereafter, it is assumed that a malfunction has occurred in the information processing apparatus $10_3$.

Then, the functions of the print server are transferred from the information processing apparatus $10_3$ to the information processing apparatus $10_2$. The virtual print server 20b operates in the information processing apparatus $10_2$ and the information processing apparatus $10_2$ realizes the print server. In this case, the first printer driver 21b, the PDL conversion software 22b, and the second printer driver 23b operate in the information processing apparatus $10_2$, too.

That is, depending on how a normal operation type and a backup type in a cluster are defined, there may be a state in which plural virtual print servers 20 operate in a single information processing apparatus 10.

For example, in the case where the virtual print server 20b is started after starting of the virtual print server 20a, when the OS spooler is restarted as described above, not only print command information transferred from the information processing apparatus $10_3$ but also print command information that has been transferred from the information processing apparatus $10_1$ and that has already been subjected to processing are initialized in the information processing apparatus $10_2$. That is, restarting of the OS spooler is not effective for the above-described issue.

Thus, in this exemplary embodiment, each information processing apparatus 10 determines whether or not a virtual print server 20 is operating in the information processing apparatus 10 in the case where the information processing apparatus 10 is in a cluster environment. When it is determined that a virtual print server 20 is operating, a state of reception of print command information from the OS spooler (hereinafter referred to as a "reception state") is set to be a state in which reception of print command information is started (hereinafter referred to as a "reception start state") and the PDL conversion software 22 is started up. When it is determined that no virtual print servers 20 are operating, the reception state is set to be a state in which reception of print command information is stopped (hereinafter referred to as a "reception stop state") and the PDL conversion software 22 is started up. When the functions of a print server are transferred to the information processing apparatus 10 due to occurrence of a malfunction in another information processing apparatus 10, the reception state is set to be the reception start state. Note that each information processing apparatus 10 sets the reception state to be the reception start state in the case where the information processing apparatus 10 is not in a cluster environment, and starts up the PDL conversion software 22.

Next, the structure of the information processing apparatus 10 that realizes such operation will be described.

Figure 6:
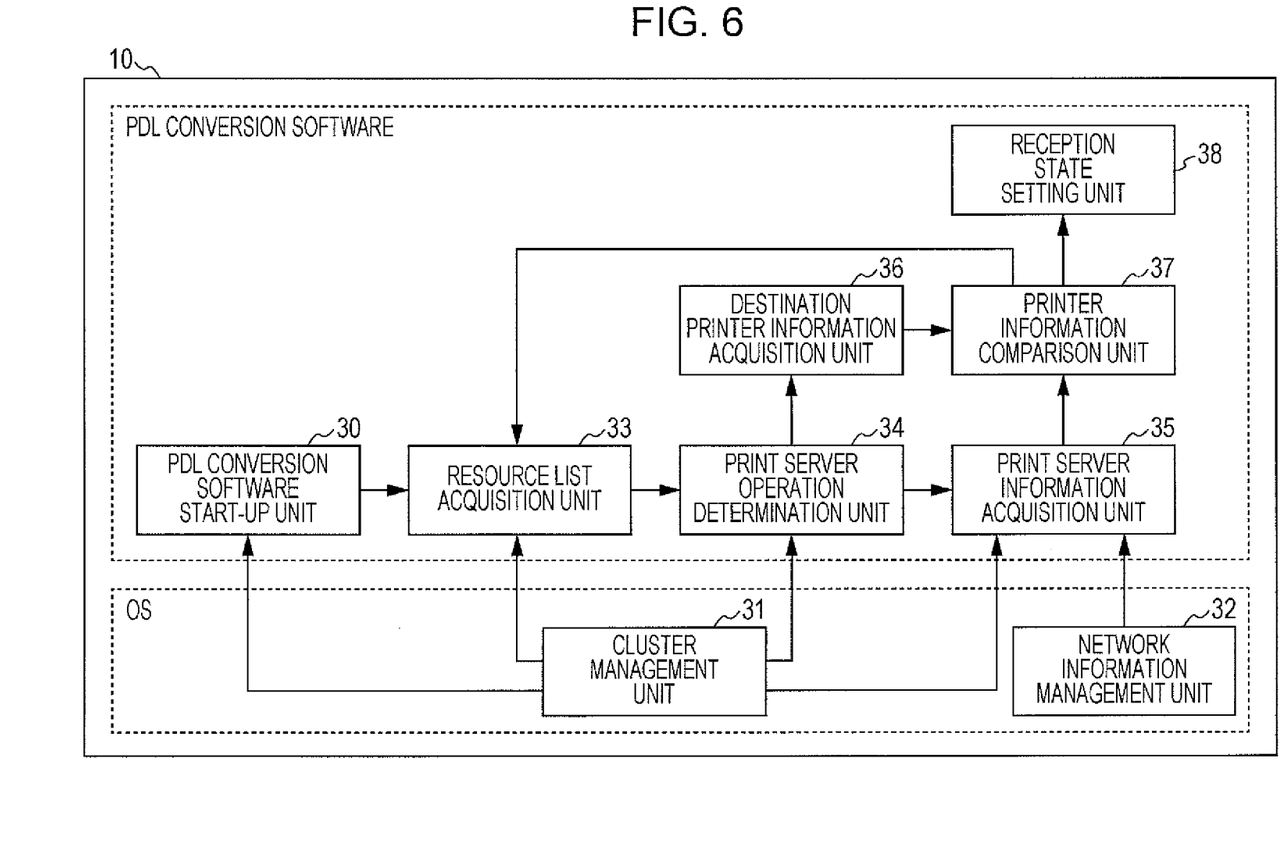
FIG. 6 is a block diagram illustrating an example of a functional structure of an information processing apparatus in the exemplary embodiment.

FIG. 6 is a block diagram illustrating an example of a functional structure of an information processing apparatus 10.

As illustrated in FIG. 6, the information processing apparatus 10 includes, as functions of the OS, a cluster management unit 31 and a network information management unit 32. That is, these functions are realized by operating software (the OS) in cooperation with hardware resources. Specifically, these functions are realized by the CPU 11 (see FIG. 2) loading programs that realize the cluster management unit 31 and the network information management unit 32 from among the functions of the OS, for example, from the HDD 13 (see FIG. 2) into the main memory 12 (see FIG. 2) and executing the programs.

The cluster management unit 31 manages a cluster including the information processing apparatus 10 on the basis of information (cluster information) regarding the cluster. Here, the cluster information includes information indicating whether or not the information processing apparatus 10 is in a cluster environment. In addition, in the case where the information processing apparatus 10 is in a cluster environment, the cluster information includes information regarding the types, names, and states of resources included in the cluster and the like, too. Specifically, in the case where the type of a resource is a print server, the name of the resource is the name of the print server and the state of the resource is, for example, whether or not the print server is operating in the information processing apparatus 10.

The network information management unit 32 manages information set for the network 80. Here, the information set for the network 80 is, for example, the name of a printer associated with a print server.

In addition, the information processing apparatus 10 includes, as functions of the PDL conversion software 22, a PDL conversion software start-up unit 30, a resource list acquisition unit 33, a print server operation determination unit 34, a print server information acquisition unit 35, a destination printer information acquisition unit 36, a printer information comparison unit 37, and a reception state setting unit 38. That is, these functions are realized by operating software (the PDL conversion software 22) in cooperation with hardware resources. Specifically, these functions are realized by the CPU 11 (see FIG. 2) loading programs that realize, from among the functions of the PDL conversion software 22, the PDL conversion software start-up unit 30, the resource list acquisition unit 33, the print server operation determination unit 34, the print server information acquisition unit 35, the destination printer information acquisition unit 36, the printer information comparison unit 37, and the reception state setting unit 38, for example, from the HDD 13 (see FIG. 2) into the main memory 12 (see FIG. 2) and executing the programs.

The PDL conversion software start-up unit 30 makes an inquiry to the cluster management unit 31 as to whether or not the information processing apparatus 10 is in a cluster environment. Upon receiving, from the cluster management unit 31, a response indicating that the information processing apparatus 10 is in a cluster environment, the PDL conversion software start-up unit 30 sets the reception state of the PDL conversion software 22 to be the reception stop state and starts up the PDL conversion software 22. Upon receiving, from the cluster management unit 31, a response indicating that the information processing apparatus 10 is not in a cluster environment, the PDL conversion software start-up unit 30 sets the reception state of the PDL conversion software 22 to be the reception start state and starts up the PDL conversion software 22.

The resource list acquisition unit 33 acquires a list of resources (a resource list) included in a cluster from the cluster management unit 31.

The print server operation determination unit 34 determines whether or not a print server included as a resource in a resource list acquired by the resource list acquisition unit 33 is operating in the information processing apparatus 10, by making an inquiry to the cluster management unit 31. In this exemplary embodiment, the print server operation determination unit 34 is provided as an example of a determination unit that determines whether or not any virtual print controller from among plural virtual print controllers has started operating in a subject apparatus (here, the information processing apparatus 10) and a determination unit that determines whether or not any virtual print controller from among plural virtual print controllers is supposed to operate in a subject apparatus (here, the information processing apparatus 10) in the case where the subject apparatus starts up.

In the case where the print server operation determination unit 34 has determined that a print server included as a resource in a resource list acquired by the resource list acquisition unit 33 is operating in the information processing apparatus 10, the print server information acquisition unit 35 acquires information regarding the print server (print server information). Here, the print server information includes the print server name of the print server and a (printer) list of the names of printers associated with the print server. In this exemplary embodiment, the print server information acquisition unit 35 is provided as an example of a first specifying unit that specifies a printer associated with a virtual print controller.

The destination printer information acquisition unit 36 acquires information regarding a printer specified as a destination of the PDL conversion software 22 (destination printer information). Here, the destination printer information is, for example, the name of the printer (destination printer name) specified as the destination. As illustrated in FIGS. 4 and 5, information output from the PDL conversion software 22 is input to the second printer driver 23. Thus, by checking the printer name of a printer that is associated with this second printer driver 23, a destination printer name is acquired. In this exemplary embodiment, the destination printer information acquisition unit 36 is provided as an example of a second specifying unit that specifies a printer corresponding to a second generation unit.

The printer information comparison unit 37 compares printer names included in a printer list acquired by the print server information acquisition unit 35 with destination printer names acquired by the destination printer information acquisition unit 36, and acquires printer names included in both the printer names included in the printer list and the destination printer names. In this exemplary embodiment, the printer information comparison unit 37 is provided as an example of a third specifying unit that specifies a printer that is included in both printers specified by the first specifying unit and printers specified by the second specifying unit.

The reception state setting unit 38 sets the reception state to be a reception start state in which reception of print command information for a printer specified by a printer name acquired by the comparison is started. In this exemplary embodiment, the reception state setting unit 38 is provided as an example of a controller that performs control such that a state of reception is set to be a state in which print command information is received, a controller that performs control such that, in the case where a subject apparatus (here, the information processing apparatus 10) starts up, the state of reception is set to be a state in which print command information is received, and a controller that controls such that, in the case where a subject apparatus (here, the information processing apparatus 10) starts up, the state of reception is set to be a state in which print command information is not received.

Next, operation of an information processing apparatus 10 according to this exemplary embodiment will be described.

Figure 7:
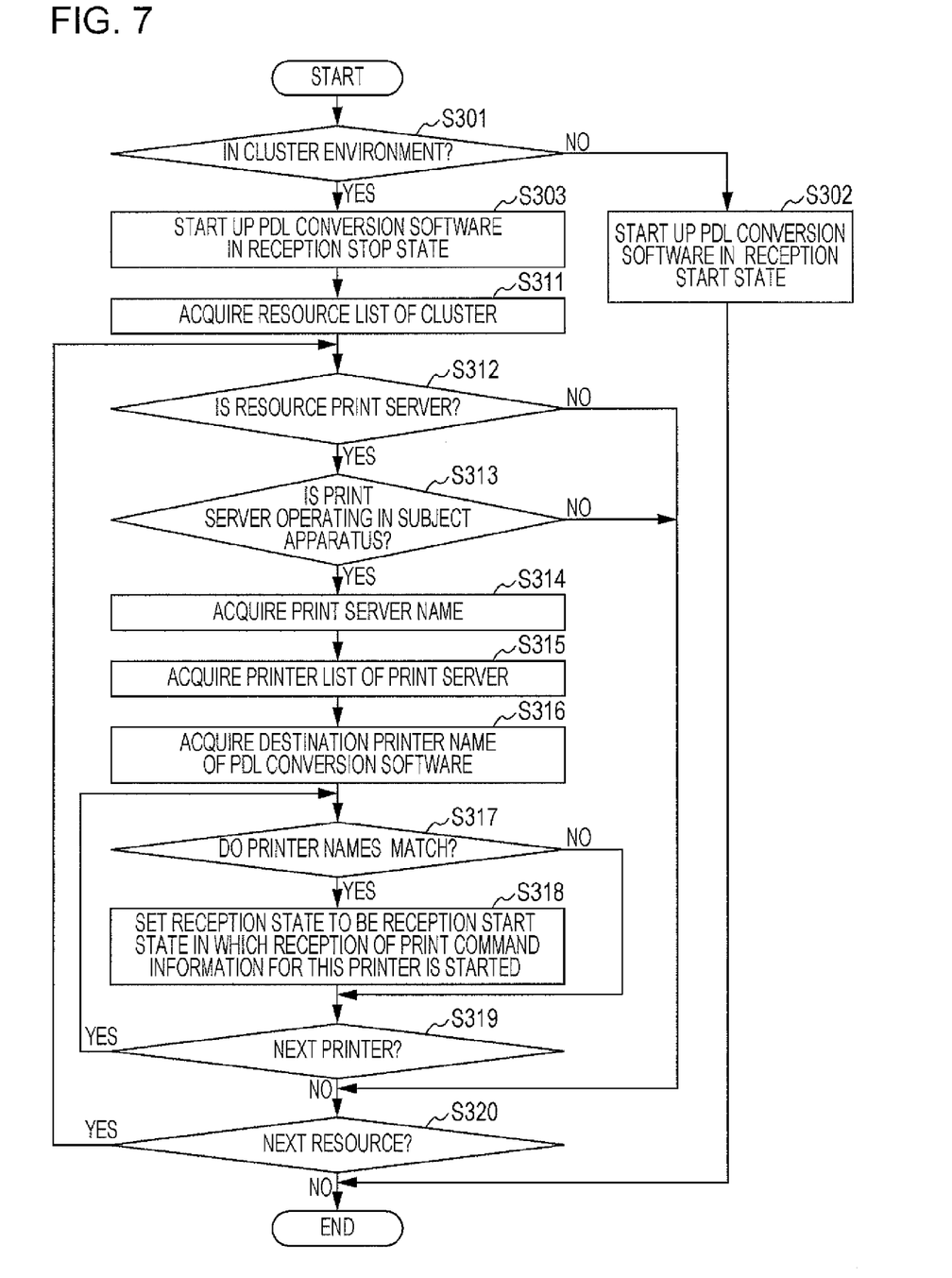
FIG. 7 is a flowchart illustrating an example of operation performed when an information processing apparatus according to the exemplary embodiment starts up.

FIG. 7 is a flowchart illustrating an example of operation when an information processing apparatus 10 starts up.

As illustrated in FIG. 7, when the PDL conversion software 22 starts up in the information processing apparatus 10, the PDL conversion software start-up unit 30 determines whether or not the information processing apparatus 10 is in a cluster environment by making an inquiry to the cluster management unit 31 (step S301). As a result, when it is determined that the information processing apparatus 10 is not in a cluster environment, the PDL conversion software start-up unit 30 sets the reception state to be the reception start state and completes starting up of the PDL conversion software 22 (step S302). In contrast, when it is determined that the information processing apparatus 10 is in a cluster environment, the PDL conversion software start-up unit 30 sets the reception state to be the reception stop state and completes starting up of the PDL conversion software 22 (step S303).

As a result, the PDL conversion software 22 performs the following processing.

That is, first, the resource list acquisition unit 33 acquires a resource list from the cluster management unit 31 (step S311). Then, one resource name is chosen from the resource list and it is determined whether or not the resource specified by the resource name is a print server (step S312).

When it is determined that the resource specified by the resource name is a print server, the print server operation determination unit 34 determines whether or not the print server is operating in the information processing apparatus 10 by making an inquiry to the cluster management unit 31 (step S313).

As a result, when it is determined that a print server is operating in the information processing apparatus 10, the print server information acquisition unit 35 acquires the print server name of the print server from the cluster management unit 31 (step S314) and acquires a printer list associated with the print server from the network information management unit 32 (step S315). The destination printer information acquisition unit 36 acquires a destination printer name specified in the PDL conversion software 22 (step S316).

Then, the printer list is transferred from the print server information acquisition unit 35 to the printer information comparison unit 37, and the destination printer name is transferred from the destination printer information acquisition unit 36 to the printer information comparison unit 37. The printer information comparison unit 37 acquires one printer name from the printer list, and determines whether or not this printer name matches the destination printer name (step S317). Normally, the destination printer name specified in the PDL conversion software 22 is included in the printer list associated with the print server. Such a determination is performed because this printer name may have been removed from the printer list associated with the print server due to some circumstances that have occurred after specification of the destination printer name in the PDL conversion software 22.

As a result, when it is determined that the printer name included in the printer list matches the destination printer name, the reception state setting unit 38 sets the reception state to be a reception start state in which reception of print command information for the printer specified by the printer name, which is determined to match the destination printer name, is started (step S318). In contrast, when it is determined that the printer name included in the printer list does not match the destination printer name, the reception state setting unit 38 does not set the reception state to be the reception start state and the reception state remains as the reception stop state.

Thereafter, the printer information comparison unit 37 determines whether or not there are printer names that have not yet been chosen from the printer list (step S319). When it is determined that there is such a printer name, the procedure returns to step S317. When it is determined that there are no such printer names, the procedure proceeds to step S320. In addition, when it is determined in step S312 that a resource is not a print server or when it is determined in step S313 that a print server is not operating in the information processing apparatus 10, the procedure also proceeds to step S320. As a result, the resource list acquisition unit 33 determines whether or not there are resource names that have not yet been chosen (step S320). When it is determined that there is such a resource name, the procedure returns to step S312. When it is determined that there are no such resource names, the procedure ends.

Figure 8:
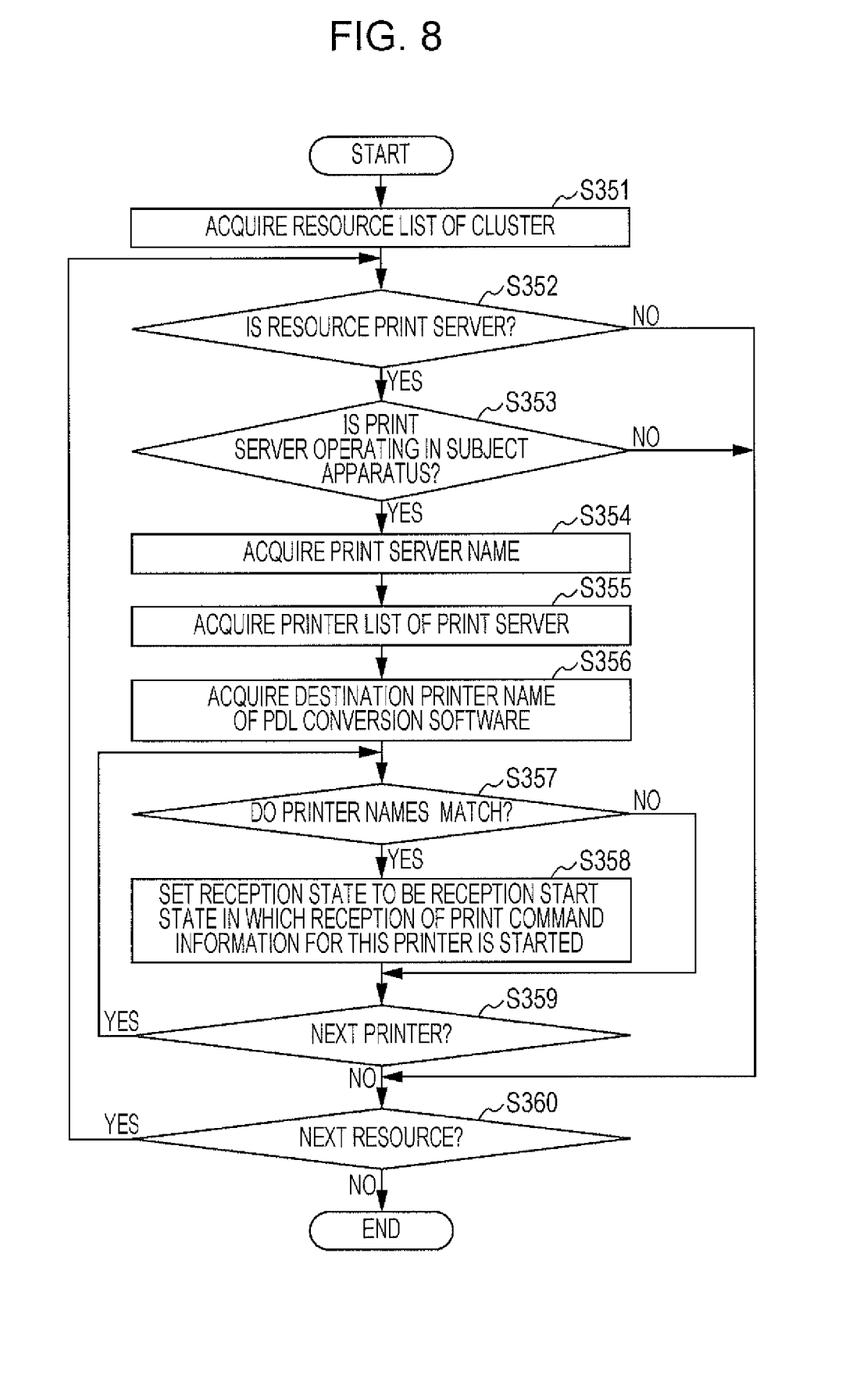
FIG. 8 is a flowchart illustrating an example of operation of monitoring processing periodically executed by an information processing apparatus according to the exemplary embodiment.

FIG. 8 is a flowchart illustrating an example of operation of monitoring processing periodically executed by an information processing apparatus 10.

In the information processing apparatus 10, the PDL conversion software 22 periodically performs the following processing.

That is, first, the resource list acquisition unit 33 acquires a resource list from the cluster management unit 31 (step S351). Then, one resource name is chosen from the resource list and it is determined whether or not the resource specified by the resource name is a print server (step S352).

When it is determined that the resource specified by the resource name is a print server, the print server operation determination unit 34 determines whether or not the print server is operating in the information processing apparatus 10 by making an inquiry to the cluster management unit 31 (step S353).

As a result, when it is determined that the print server is operating in the information processing apparatus 10, the print server information acquisition unit 35 acquires the print server name of the print server from the cluster management unit 31 (step S354) and acquires a printer list associated with the print server from the network information management unit 32 (step S355). The destination printer information acquisition unit 36 acquires a destination printer name specified in the PDL conversion software 22 (step S356).

Then, the printer list is transferred from the print server information acquisition unit 35 to the printer information comparison unit 37, and the destination printer name is transferred from the destination printer information acquisition unit 36 to the printer information comparison unit 37. The printer information comparison unit 37 chooses one printer name from the printer list and determines whether or not this printer name matches the destination printer name (step S357). Normally, the destination printer name specified in the PDL conversion software 22 is included in the printer list associated with the print server. Such a determination is performed because this printer name may have been removed from the printer list associated with the print server due to some circumstances that have occurred after specification of the destination printer name in the PDL conversion software 22.

As a result, when it is determined that the printer name included in the printer list matches the destination printer name, the reception state setting unit 38 sets the reception state to be a reception start state in which reception of print command information for the printer specified by the printer name, which is determined to match the destination printer name, is started (step S358). In contrast, when it is determined that the printer name included in the printer list does not match the destination printer name, the reception state setting unit 38 does not set the reception state to be the reception start state and the reception state remains as the reception stop state.

Thereafter, the printer information comparison unit 37 determines whether or not there are printer names that have not yet been chosen from the printer list (step S359). When it is determined that there is such a printer name, the procedure returns to step S357. When it is determined that there are no such printer names, the procedure proceeds to step S360. In addition, when it is determined in step S352 that a resource is not a print server or when it is determined in step S353 that a print server is not operating in the information processing apparatus 10, the procedure also proceeds to step S360. As a result, the resource list acquisition unit 33 determines whether or not there are resource names that have not yet been chosen (step S360). When it is determined that there is such a resource name, the procedure returns to step S352. When it is determined that there are no such resource names, the procedure ends.

The structures and operation of the information processing apparatuses 10 in this exemplary embodiment have been described above.

In this exemplary embodiment, a state in which plural virtual print servers 20 start up in a single information processing apparatus 10 is caused on the assumption that, as illustrated in FIG. 5, malfunctions occur in information processing apparatuses 10 other than the single information processing apparatus 10 in each of which a virtual print server 20 is operating, but the cause of such a state is not limited thereto. The state in which plural virtual print servers 20 start up in a single information processing apparatus 10 may be caused by some reasons other than occurrence of malfunctions in information processing apparatuses 10 other than the single information processing apparatus 10.

Note that a program that realizes this exemplary embodiment may be of course provided by a communication unit, and may also be provided in a recording medium such as a CD-ROM or the like in which the program is stored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
   a determination unit that determines, from among a plurality of virtual print controllers each of which controls printing at a printing apparatus associated with the virtual print controller, whether any of the virtual print controllers has started operating in the print control apparatus, the plurality of virtual print controllers virtually realizing a plurality of apparatuses in a single apparatus upon operating in the single apparatus; and
   a controller that performs control, responsive to the determination unit determining that none of the virtual print controllers have started operating in the print control apparatus from among the plurality of virtual print controllers, such that a state of reception of print command information, which commands printing at a printing apparatus, is set to be a state in which the print command information is not received, and
   the controller thereafter performs control, responsive to the determination unit determining that any of the virtual print controllers has started operating in the print control apparatus from among the plurality of virtual print controllers, such that the state of reception is set to be a state in which print command information that commands printing at a printing apparatus associated with the virtual print controller is received.

2. The print control apparatus according to claim 1, wherein the determination unit periodically determines, from among the plurality of virtual print controllers, whether any of the virtual print controllers has started operating in the print control apparatus.

3. The print control apparatus according to claim 1, wherein each of the plurality of virtual print controllers makes a group of print control apparatuses corresponding to the virtual print controller be seen as a single print control apparatus, the group of print control apparatuses including the print control apparatus, and, while the virtual print controller is operating in another print control apparatus other than the print control apparatus among the group of print control apparatuses corresponding to the virtual print controller, when a malfunction occurs in the other print control apparatus, the virtual print controller starts operating in the print control apparatus.

4. The print control apparatus according to claim 2, wherein each of the plurality of virtual print controllers makes a group of print control apparatuses corresponding to the virtual print controller be seen as a single print control apparatus, the group of print control apparatuses including the print control apparatus, and, while the virtual print controller is operating in another print control apparatus other than the print control apparatus among the group of print control apparatuses corresponding to the virtual print controller, when a malfunction occurs in the other print control apparatus, the virtual print controller starts operating in the print control apparatus.

5. The print control apparatus according to claim 3, wherein the determination unit determines whether any of the plurality of virtual print controllers is supposed to operate in the print control apparatus responsive to the print control apparatus starting up, and
   responsive to the determination unit determining that any of the plurality of virtual print controllers is supposed to operate in the print control apparatus when the print control apparatus starts up, the controller performs control such that the state of reception of print command information, which commands printing at a printing apparatus, is set to be a state in which print command information that commands printing at a printing apparatus associated with the virtual print controller is received.

6. The print control apparatus according to claim 4, wherein the determination unit determines whether any of the plurality of virtual print controllers are supposed to operate in the print control apparatus responsive to the print control apparatus starting up, and
   responsive to the determination unit determining that any of the plurality of virtual print controllers is supposed to operate in the print control apparatus when the print control apparatus starts up, the controller performs control such that the state of reception of print command information, which commands printing at a printing apparatus, is set to be a state in which print command information that commands printing at a printing apparatus associated with the virtual print controller is received.

7. The print control apparatus according to claim 3, wherein the determination unit determines whether any of the plurality of virtual print controllers is supposed to operate in the print control apparatus responsive to the print control apparatus starting up, and responsive to the determination unit determining that none of the plurality of virtual print controllers are supposed to operate in the print control apparatus when the print control apparatus starts up, the controller performs control such that the state of reception of print command information, which commands printing at a printing apparatus, is set to be a state in which the print command information is not received.

8. The print control apparatus according to claim 4, wherein the determination unit determines whether any of the plurality of virtual print controllers is supposed to operate in the print control apparatus responsive to the print control apparatus starting up, and responsive to the determination unit determining that none of the plurality of virtual print controllers are supposed to operate in the print control apparatus when the print control apparatus starts up, the controller performs control such that the state of reception of print command information, which commands printing at a printing apparatus, is set to be a state in which the print command information is not received.

9. The print control apparatus according to claim 1, further comprising:

a first specifying unit that specifies, responsive to the determination unit determining that any of the plurality of virtual print controllers has started operating in the print control apparatus, printing apparatuses associated with the virtual print controller;

a first generation unit that operates in an apparatus virtually realized by the virtual print controller and generates print command information that commands printing at a first-type printing apparatus;

a second generation unit that operates in the apparatus virtually realized by the virtual print controller and generates print command information that commands printing at a second-type printing apparatus;

a conversion unit that converts the print command information generated by the first generation unit into information that the second generation unit uses to generate print command information;

a second specifying unit that specifies printing apparatuses that are specified by the conversion unit as output destinations of information converted by the conversion unit and that correspond to the second generation unit; and a third specifying unit that specifies a printing apparatus that is included in both the printing apparatuses specified by the first specifying unit and the printing apparatuses specified by the second specifying unit, wherein the controller performs control such that the state of reception of print command information, which commands printing at a printing apparatus, is set to be a state in which print command information that commands printing at a printing apparatus specified by the third specifying unit is received.

10. The print control apparatus according to claim 2, further comprising:

a first specifying unit that specifies, responsive to the determination unit determining that any of the plurality of virtual print controllers has started operating in the print control apparatus, printing apparatuses associated with the virtual print controller;

a first generation unit that operates in an apparatus virtually realized by the virtual print controller and generates print command information that commands printing at a first-type printing apparatus;

a second generation unit that operates in the apparatus virtually realized by the virtual print controller and generates print command information that commands printing at a second-type printing apparatus;

a conversion unit that converts the print command information generated by the first generation unit into information that the second generation unit uses to generate print command information;

a second specifying unit that specifies printing apparatuses that are specified by the conversion unit as output destinations of information converted by the conversion unit and that correspond to the second generation unit; and a third specifying unit that specifies a printing apparatus that is included in both the printing apparatuses specified by the first specifying unit and the printing apparatuses specified by the second specifying unit, wherein the controller performs control such that the state of reception of print command information, which commands printing at a printing apparatus, is set to be a state in which print command information that commands printing at a printing apparatus specified by the third specifying unit is received.

11. The print control apparatus according to claim 3, further comprising:

a first specifying unit that specifies, responsive to the determination unit determining that any of the plurality of virtual print controllers has started operating in the print control apparatus, printing apparatuses associated with the virtual print controller;

a first generation unit that operates in an apparatus virtually realized by the virtual print controller and generates print command information that commands printing at a first-type printing apparatus;

a second generation unit that operates in the apparatus virtually realized by the virtual print controller and generates print command information that commands printing at a second-type printing apparatus;

a conversion unit that converts the print command information generated by the first generation unit into information that the second generation unit uses to generate print command information;

a second specifying unit that specifies printing apparatuses that are specified by the conversion unit as output destinations of information converted by the conversion unit and that correspond to the second generation unit; and a third specifying unit that specifies a printing apparatus that is included in both the printing apparatuses specified by the first specifying unit and the printing apparatuses specified by the second specifying unit, wherein the controller performs control such that the state of reception of print command information, which commands printing at a printing apparatus, is set to be a state in which print command information that commands printing at a printing apparatus specified by the third specifying unit is received.

12. The print control apparatus according to claim 4, further comprising:
- a first specifying unit that specifies, responsive to the determination unit determining that any of the plurality of virtual print controllers has started operating in the print control apparatus, printing apparatuses associated with the virtual print controller;
- a first generation unit that operates in an apparatus virtually realized by the virtual print controller and generates print command information that commands printing at a first-type printing apparatus;
- a second generation unit that operates in the apparatus virtually realized by the virtual print controller and generates print command information that commands printing at a second-type printing apparatus;
- a conversion unit that converts the print command information generated by the first generation unit into information that the second generation unit uses to generate print command information;
- a second specifying unit that specifies printing apparatuses that are specified by the conversion unit as output destinations of information converted by the conversion unit and that correspond to the second generation unit; and
- a third specifying unit that specifies a printing apparatus that is included in both the printing apparatuses specified by the first specifying unit and the printing apparatuses specified by the second specifying unit,
- wherein the controller performs control such that the state of reception of print command information, which commands printing at a printing apparatus, is set to be a state in which print command information that commands printing at a printing apparatus specified by the third specifying unit is received.

13. The print control apparatus according to claim 5, further comprising:
- a first specifying unit that specifies, responsive to the determination unit determining that any of the plurality of virtual print controllers has started operating in the print control apparatus, printing apparatuses associated with the virtual print controller;
- a first generation unit that operates in an apparatus virtually realized by the virtual print controller and generates print command information that commands printing at a first-type printing apparatus;
- a second generation unit that operates in the apparatus virtually realized by the virtual print controller and generates print command information that commands printing at a second-type printing apparatus;
- a conversion unit that converts the print command information generated by the first generation unit into information that the second generation unit uses to generate print command information;
- a second specifying unit that specifies printing apparatuses that are specified by the conversion unit as output destinations of information converted by the conversion unit and that correspond to the second generation unit; and
- a third specifying unit that specifies a printing apparatus that is included in both the printing apparatuses specified by the first specifying unit and the printing apparatuses specified by the second specifying unit,
- wherein the controller performs control such that the state of reception of print command information, which commands printing at a printing apparatus, is set to be a state in which print command information that commands printing at a printing apparatus specified by the third specifying unit is received.

14. The print control apparatus according to claim 6, further comprising:
- a first specifying unit that specifies, responsive to the determination unit determining that any of the plurality of virtual print controllers has started operating in the print control apparatus, printing apparatuses associated with the virtual print controller;
- a first generation unit that operates in an apparatus virtually realized by the virtual print controller and generates print command information that commands printing at a first-type printing apparatus;
- a second generation unit that operates in the apparatus virtually realized by the virtual print controller and generates print command information that commands printing at a second-type printing apparatus;
- a conversion unit that converts the print command information generated by the first generation unit into information that the second generation unit uses to generate print command information;
- a second specifying unit that specifies printing apparatuses that are specified by the conversion unit as output destinations of information converted by the conversion unit and that correspond to the second generation unit; and
- a third specifying unit that specifies a printing apparatus that is included in both the printing apparatuses specified by the first specifying unit and the printing apparatuses specified by the second specifying unit,
- wherein the controller performs control such that the state of reception of print command information, which commands printing at a printing apparatus, is set to be a state in which print command information that commands printing at a printing apparatus specified by the third specifying unit is received.

15. The print control apparatus according to claim 7, further comprising:
- a first specifying unit that specifies, responsive to the determination unit determining that any of the plurality of virtual print controllers has started operating in the print control apparatus, printing apparatuses associated with the virtual print controller;
- a first generation unit that operates in an apparatus virtually realized by the virtual print controller and generates print command information that commands printing at a first-type printing apparatus;
- a second generation unit that operates in the apparatus virtually realized by the virtual print controller and generates print command information that commands printing at a second-type printing apparatus;
- a conversion unit that converts the print command information generated by the first generation unit into information that the second generation unit uses to generate print command information;
- a second specifying unit that specifies printing apparatuses that are specified by the conversion unit as output destinations of information converted by the conversion unit and that correspond to the second generation unit; and
- a third specifying unit that specifies a printing apparatus that is included in both the printing apparatuses specified by the first specifying unit and the printing apparatuses specified by the second specifying unit,
- wherein the controller performs control such that the state of reception of print command information, which commands printing at a printing apparatus, is set to be a state in which print command information that commands printing at a printing apparatus specified by the third specifying unit is received.

16. The print control apparatus according to claim 8, further comprising:
- a first specifying unit that specifies, responsive to the determination unit determining that any of the plurality of virtual print controllers has started operating in the print control apparatus, printing apparatuses associated with the virtual print controller;
- a first generation unit that operates in an apparatus virtually realized by the virtual print controller and generates print command information that commands printing at a first-type printing apparatus;
- a second generation unit that operates in the apparatus virtually realized by the virtual print controller and generates print command information that commands printing at a second-type printing apparatus;
- a conversion unit that converts the print command information generated by the first generation unit into information that the second generation unit uses to generate print command information;
- a second specifying unit that specifies printing apparatuses that are specified by the conversion unit as output destinations of information converted by the conversion unit and that correspond to the second generation unit; and
- a third specifying unit that specifies a printing apparatus that is included in both the printing apparatuses specified by the first specifying unit and the printing apparatuses specified by the second specifying unit,
- wherein the controller performs control such that the state of reception of print command information, which commands printing at a printing apparatus, is set to be a state in which print command information that commands printing at a printing apparatus specified by the third specifying unit is received.

17. A printing system comprising:
- a plurality of printing apparatuses that print an image on a medium; and
- a print control apparatus that controls printing at the plurality of printing apparatuses,
- the print control apparatus including
  - a determination unit that determines, from among a plurality of virtual print controllers each of which controls printing at a group of printing apparatuses included in the plurality of printing apparatuses and associated with the virtual print controller, whether any of the virtual print controllers has started operating in the print control apparatus, the plurality of virtual print controllers virtually realizing a plurality of apparatuses in a single apparatus upon operating in the single apparatus, and
  - a controller that performs control, responsive to the determination unit determining that none of the virtual print controllers have started operating in the print control apparatus from among the plurality of virtual print controllers, such that a state of reception of print command information, which commands printing at a printing apparatus, is set to be a state in which the print command information is not received, and
  - the controller thereafter performs control, responsive to the determination unit determining that any of the virtual print controllers has started operating in the print control apparatus from among the plurality of virtual print controllers, such that the state of reception is set to be a state in which print command information that commands printing at a group of printing apparatuses associated with the virtual print controller is received.

18. A non-transitory computer readable medium storing a program causing a computer to execute a process, the process comprising:
- determining, from among a plurality of virtual print controllers each of which controls printing at a printing apparatus associated with the virtual print controller, whether any of the virtual print controllers has started operating in a print control apparatus, the plurality of virtual print controllers virtually realizing a plurality of apparatuses in a single apparatus upon operating in the single apparatus; and
- performing control, responsive to determining that none of the virtual print controllers have started operating in the print control apparatus from among the plurality of virtual print controllers, such that a state of reception of print command information, which commands printing at a printing apparatus, is set to be a state in which the print command information is not received, and
- thereafter performing control, responsive to determining that any of the virtual print controllers has started operating in the print control apparatus from among the plurality of virtual print controllers, such that the state of reception is set to be a state in which print command information that commands printing at a printing apparatus associated with the virtual print controller is received.

* * * * *